United States Patent [19]

Teachout

[11] Patent Number: 4,974,655
[45] Date of Patent: Dec. 4, 1990

[54] CONTOURED FOLDABLE SUN SHADE FOR WINDSHIELDS

[75] Inventor: James F. Teachout, Tucson, Ariz.
[73] Assignee: Kailyn Products, Inc., Tucson, Ariz.
[21] Appl. No.: 363,565
[22] Filed: Jun. 7, 1989
[51] Int. Cl.$^5$ .............................................. B60J 1/20
[52] U.S. Cl. ............................... 160/84.1; 160/370.2; 296/97.7
[58] Field of Search ............. 160/84.1, 370.2, DIG. 2, 160/DIG. 3; 296/97.7, 97.8, 97.1

[56] References Cited

U.S. PATENT DOCUMENTS

| | | |
|---|---|---|
| D. 236,868 | 9/1975 | Levy . |
| D. 236,869 | 9/1975 | Levy . |
| D. 236,870 | 9/1975 | Levy . |
| D. 237,663 | 11/1975 | Levy . |
| D. 294,819 | 3/1988 | Kuri . |
| 4,202,396 | 5/1980 | Levy ............................. 296/97.7 X |
| 4,652,039 | 3/1987 | Richards ........................... 296/97.7 |
| 4,671,334 | 6/1987 | Yadegar et al. ................... 160/84.1 |
| 4,727,920 | 3/1988 | Siegler ........................... 296/97.8 X |
| 4,763,947 | 8/1988 | Gregg ............................. 296/97.7 X |
| 4,777,994 | 10/1988 | Nederveld ....................... 296/97.7 X |
| 4,805,955 | 2/1989 | Levy ............................. 160/84.1 |
| 4,838,334 | 6/1989 | Hogg et al. ..................... 296/97.8 X |
| 4,838,335 | 6/1989 | Eskandry et al. ............... 296/97.7 X |
| 4,838,600 | 6/1989 | Wischusen ....................... 296/97.8 |

Primary Examiner—David M. Purol
Attorney, Agent, or Firm—Leydig, Voit & Mayer

[57] ABSTRACT

Foldable sun shades, for interior use at windshields and the like, where the quadrilateral plane of such shades, formed through the combination of its' angled upper and lower margins and its' folding panels, which are jointed to each other at angled longitudinal fold lines, are sectionally and compositely constructed in trapezium and/or trapezoid configurations. Employment of the embodied trapezium compositions will produce contoured sun shades with superior symmetry, as this geometric structure takes the aspects of horizontal and vertical windshield glass curvatures into account. To further enhance this shade to glass symmetry, these trapezium and/or trapezoid patterned shades have their resulting fanfold panels diagonally elevated at their latitudinal top and bottom margins; the shade's left and right margins are established as bottom to top cut edges which angle towards the sun shade's center, to better assimilate the angle of the windshield side posts; and the oscillating fold pattern of the sun shade's panels is reversed at the shades' longitudinal center to compensate for the prosaic center to left, and center to right, windshield cowl and header curvatures. The use and handling of the embodied sun shades is also augmented by the rounded corners at all margin intersections, and the serrated die cut edges used throughout.

5 Claims, 1 Drawing Sheet

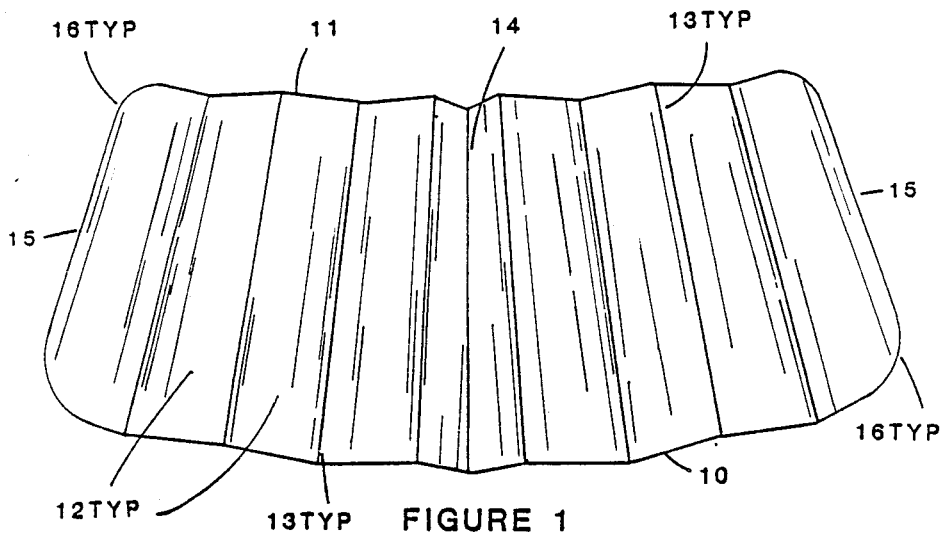
FIGURE 1
FIGURE 2
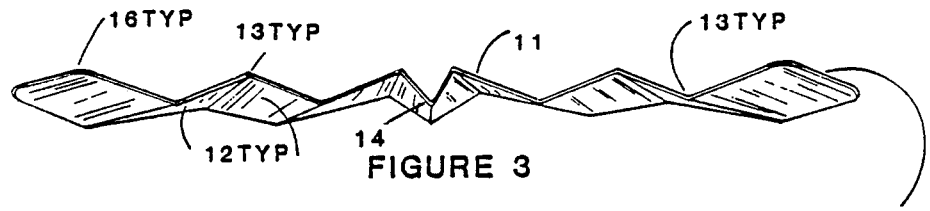
FIGURE 3
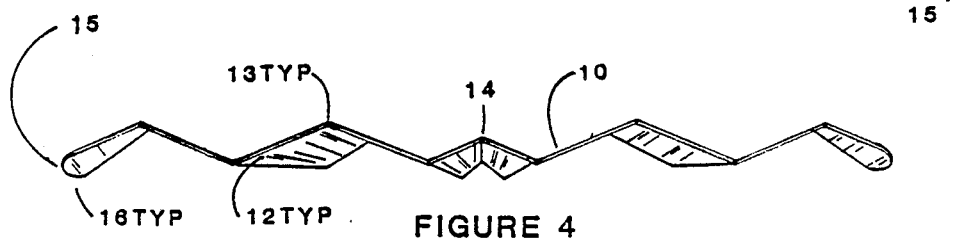
FIGURE 4
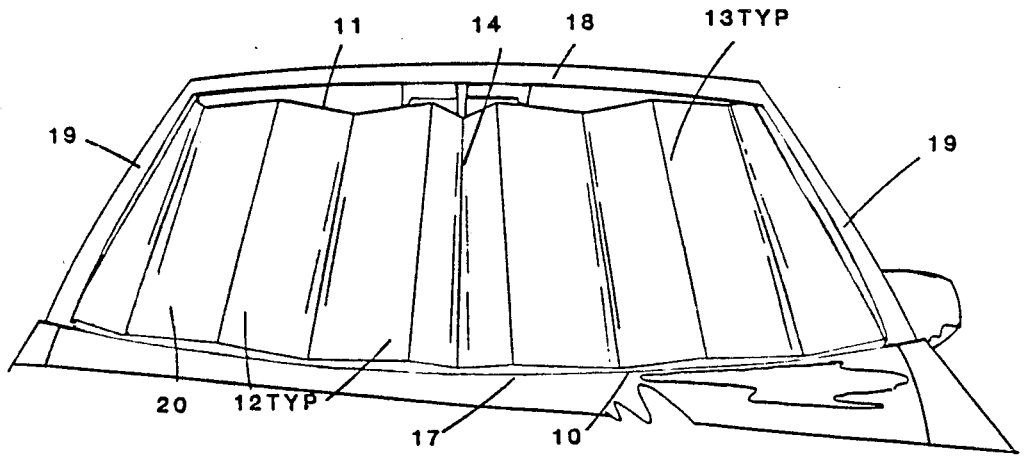
FIGURE 5

CONTOURED FOLDABLE SUN SHADE FOR WINDSHIELDS

BACKGROUND

This invention relates to a foldable sun shade which employs a geometric structure to compensate for vertical windshield contours. The embodied trapezium panel components, and the extended trapezium or trapezoid pattern of this sun shades' quadrilateral plane, results in a shade that better fits the horizontal and vertical contours of the windshield surface.

Rectangular patterned, non-conforming foldable sunshields, have been previously developed and designed. One such is described in U.S. Pat. No. 4,202,396, entitled "SUNSHIELD FOR MOTOR VEHICLES" issued May 31, 1980, to Levy. The sunshields offered in the Levy patent are specifically and singularly designed and described as ".. foldable sunshield for motor vehicles comprises a plurality of planar rectangular elements .. ", and always with " .. edges extending at right angles .. ". None of the embodiments of the Levy sunshield, offer any structural compensations for the angled frame elements or the opposing glass curvatures common in most windshields; nor do they allow for the resulting geometric growth in windshield glass areas.

"DESIGN" patents which, in part or whole, model the same utilitarian and structural features as the above described Levy patent are Design U.S. Pat. Nos. 236,868 9/1975; 236,869 9/1975; 236,870 9/1975; 237,663 11/1975, all issued to Levy; and Design U.S. Pat. No. 294,819 3/1988, issued to Kuri.

It is clear from the foregoing analysis and background that the utilitarian and structural elements of previously designed sunshields have failed to address the intrinsic glass curvatures of windsheilds in automobiles and the like.

It is the principal object of this invention to overcome the conforming deficiencies currently patterned in past substantially rigid yet foldable sun shades. Further objects of this invention are, to provide substantially rigid sun shades with windshield conforming geometric structural elements; to employ certain structural elements which will address the amalgamation of sun shades and windshield structures and their contoured surfaces; by employing such contouring geometric fold and shade extension patterns, to enhance the utility of foldable sun shades; to provide contoured foldable sun shades which can be easily set in place, folded and/or stored; and through material selections, to provide sun shades which can be readily and economically fabricated, and to provide sun shades which exhibit reasonably long life.

This invention incorporates elementary and composite trapezium or trapezoid patterns to produce foldable sun shades of substantially rigid materials with a quadrilateral plane, in its expanded/stretched position, which conforms to horizontal and vertical windshield/glass curvatures.

The cowl/base of most if not all windshields wrap on a curve from their extended center point back to the left and right margins. To conform to the resulting horizontal radii, the lower margin of the sun shade embodied here, is established as a diagonal cut which elevates slightly, continuously or in steps, from the center of the shade to the outside left and right edges. This first consideration allows the base of the sun shade to be set more closely tot he glass surface and, since the bottom of the shade usually rests on the cowl of the windshield which is formed on or as part of the interior dash, this compensation results in a sun shade which more closely follows the crescent plane of the glass from its apex center to its left and right margins.

The upper margin of the embodied contoured sun shades is similarly established however, the preferred angle of this margin cut from center to left and center to right, elevates substantially more than that provided at the bottom margin. This top margin height extension is an element which compensates both for the increased area of windshield due to glass curvatures, and for the slight loss in shade standing height which results from the contouring cut of the shade employed at the lower margin.

A superior utility feature ensues when the folding pattern of these contour sun shades starts with a vertical score at the quadrilateral center. This center line fold divides the sun shade into jointed halves, which then allows the shade to be extended equally from its center, and for the alternately folding jointed panels to be reverse gathered to a compressed position.

The transitional fold pattern of this sun shade and its' jointed panels is established as trapezium plane elements hinged together at diagonal score lines which taper from their bottom margin to their top margin. This feature also results in shades which are longer at their expanded lower margin than they are at their expanded upper margin. Again, this design consideration results in sun shades which more closely assimilates the proportions of glass area in typical windshields.

The outside left and right margins of these contoured foldable sun shades are established as diagonal cut lines which taper off a true vertical line towards the center of the sun shade. This feature is also necessary for the shade's outside edges to incorporate the bottom to top tapered angles of the typical windshield glass side margins at their frame posts.

By constructing the sunshades with upper and lower margins that are established as diagonal cuts which elevate at obtuse angles from the center fold of the shade to the opposite lateral edges, the sunshades are chevron-shaped and the opposite lateral edges taper in the direction from the lower margin towards the center fold line thereby more closely matching the tapered angles of the typical windshield side margins at their frame posts.

To promote easier use and safer unit handling, the sun shades offered in this disclosure are further enhanced with all rounded corners and serrated cut margins and edges. These additional features will help minimize corner snags while installing or removing the units, and reduce the risk of paper cuts while handling the shades in general.

This CONTOURED FOLDABLE SUN SHADE FOR WINDSHIELDS invention, and the various embodiments thereof, are depicted in the example drawings of this invention, and more fully described and in their accompanying narratives.

BRIEF DESCRIPTION OF THE DRAWINGS

FIG. 1 is an elevated view of the embodied chevron-shaped patterned sun shade as it appears in an expanded position.

FIG. 2 is a side elevation of the embodied chevron-shaped patterned sun shade as it appears in its folded position, and as projected from FIG. 1.

FIG. 3 is a perspective top view of the same embodiment featured in FIG. 1.

FIG. 4 is a perspective bottom view of the same embodiment featured in FIG. 1.

FIG. 5 is a perspective/front/exterior view of a windshield and the embodied contoured sun shade, in combination. This view shows the geometric symmetry attainable through this invention.

DETAILED DESCRIPTION OF THE DRAWINGS

FIG. 1 illustrates the elementary and composite configurations embodied in the present invention. The quadrilateral plane of the sun shade shown is established through the combination of angled lower 10 and upper 11 margins, and trapezium panels 12 jointed to each other at their longitudinal angled fold lines 13.

Functionally, this contoured foldable sun shade's jointed 13 trapezium panels 12 oscillate open, left and right, to the expanded trapezium plane shown in FIG. 1. The extended length at the sun shade's lower margin 10 results from the bottom to top taper of the jointed panels 12, and the "center to left" and "center to right" elevated angles of the lower margin 10. Similarly the "center to left" and "center to right" angles employed at the top margin 11, in concert with the bottom to top taper of the jointed panels 12, produces a sun shade with outside height extensions along the top margin 11. The vertical score, which constitutes the apexed center fold line 14, allows the sun shades to be expanded equally from the center, and for the jointed panels 12 to be reverse gathered when alternately folded. The outside left and right margins 15 are formed on diagonal cut lines which taper towards the shade's center, from bottom to top. The angles of the tapered outside margins 15; the bottom to top tapered panels 12; and the diagonal lower 10 and upper 11 margins, are autonomous however, the quadrilateral plane which these elements combine to form is symmetrical to most windshield contours (see FIG. 5). The rounded corners 16 at the sun shade's intersecting margins 10/15 and 11/15 are provided to help minimize corner snags while installing and/or removing the units. (see FIG. 1 and FIG. 5). The sequential fold patterns 13 and 14; bottom to top taper of the jointed panels 12; and the diagonal cut line of the left and right margins 15, are further represented in top view FIG. 3 and bottom view FIG. 4. The trapezium plane of the embodied sun shade in a folded position is illustrated in FIG. 2 (as projected from FIG. 1).

FIG. 5 shows the combination of contoured foldable sun shades and windshield structures according to the preferred embodiments of the subject invention. The trapezium plane of the windshield structure, formed through an amalgamation of the cowl 17, header 18, and end posts 19, and the glass surface 20 curvatures, are assimilated by the sun shade's sectional and composite trapezium configurations.

To those skilled in the art, the detail of this disclosure will render variations and/or modifications to the embodiments within the scope of this invention.

I claim:

1. A contoured foldable sun shade for a curved automobile windshield comprising:

a chevron-shaped stiff sheet having an upper margin and lower margin established by substantially straight continuous cuts in sheet material which elevate at obtuse angles from a center fold line to opposite lateral edges, the center fold line dividing the sun shade into symmetrical jointed halfs, the straight diagonal cuts at the upper margin extending at an obtuse angle which elevates substantially more than the obtuse angle at the lower margin, thereby allowing the sun shade when resting on a cowl to more closely follow the curve of the windshield from its apex center to its left and right edges at corner posts, each jointed half having score lines which divide the respective half into adjacent tapered panels hinged along the score lines which taper from the lower margin to the upper margin, thereby allowing the sun shade to be extended equally from the center fold line and for alternately folding jointed panels to be reverse gathered to a compressed position wherein the panels of the sun shade comprise quadrilateral plane patterns with no two sides parallel, the opposite lateral edges of the sheet being established by diagonal cuts which taper in a direction from the lower margin to the upper margin towards the center fold line, thereby allowing the sun shade when resting on the cowl to more closely match tapered angles at the left and right corner posts.

2. The combination in accordance with claim 1, wherein the lower margin of the sun shade is established as a slightly diagonal cut line from the sun shade center to its' outside left and right margins.

3. The combination in accordance with claim 1, wherein the upper margin of the sun shade is established as a slightly diagonal cut line from the sun shade center to its' outside left and right margins.

4. The combination in accordance with claim 1, wherein all corners are rounded by employing spherical cuts at the sun shade margin intersections.

5. The combination in accordance with claim 1, wherein all margins are provided by serrated knives in a die cutting process for cutting the sheet material.

* * * * *